(12) United States Patent
Kawamoto et al.

(10) Patent No.: US 7,928,689 B2
(45) Date of Patent: Apr. 19, 2011

(54) INFORMATION PROCESSING APPARATUS, INFORMATION PROCESSING METHOD AND PROGRAM

(75) Inventors: Daisuke Kawamoto, Saitama (JP); Takeshi Furusho, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/915,629

(22) Filed: Oct. 29, 2010

(65) Prior Publication Data

US 2011/0047396 A1 Feb. 24, 2011

Related U.S. Application Data

(63) Continuation of application No. 11/470,683, filed on Sep. 7, 2006, now Pat. No. 7,852,043.

(30) Foreign Application Priority Data

Sep. 9, 2005 (JP) ................................ 2005-262058

(51) Int. Cl.
*H02J 7/00* (2006.01)
(52) U.S. Cl. ...................... 320/106; 713/322; 713/340
(58) Field of Classification Search .................. 320/106; 713/322
See application file for complete search history.

(56) References Cited

U.S. PATENT DOCUMENTS

| 5,982,145 | A | 11/1999 | Eguchi |
| 6,288,522 | B1 | 9/2001 | Odaohhara et al. |
| 6,928,568 | B2 * | 8/2005 | Breen et al. .................... 713/340 |
| 2004/0133816 | A1 * | 7/2004 | Miyairi et al. ................ 713/300 |
| 2004/0243863 | A1 | 12/2004 | Matsuoka |

FOREIGN PATENT DOCUMENTS

| JP | 07-241047 | 9/1995 |
| JP | 09-261888 | 10/1997 |
| JP | 2000-214966 | 8/2000 |
| JP | 2000-324713 | 11/2000 |
| JP | 2004-133646 | 4/2004 |
| JP | 2004-215413 | 7/2004 |
| JP | 2004-348662 | 12/2004 |

* cited by examiner

*Primary Examiner* — Edward Tso
*Assistant Examiner* — Samuel Berhanu
(74) *Attorney, Agent, or Firm* — SNR Denton US LLP

(57) ABSTRACT

An information processing apparatus including (a) a storage section storing AC adapter capacity identification, (b) a first section for outputting the AC adapter capacity information, (c) a setting section for setting threshold values used to control power consumption of the apparatus, (d) a detection section for detecting the power consumption of the apparatus, and (e) a control section for controlling power consumption based on whether the power consumption exceeds one of the thresholds.

4 Claims, 10 Drawing Sheets

FIG. 5

| | POWER SUPPLY DISCRIMINATION SIGNAL | AC ADAPTER CAPACITY IDENTIFICATION SIGNAL | EXTENSION UNIT CONNECTION SIGNAL | USE CONDITION | THROTTLE CONTROL STARTING THRESHOLD VALUE (THt) | BATTERY CHARGING CONTROL STARTING THRESHOLD VALUE (THc) |
|---|---|---|---|---|---|---|
| (1) | L | - | - | BATTERY OPERATION | P1 | NOT SET |
| (2) | H | L | - | 64 W AC ADAPTER OPERATION | P2 | P4 |
| (3) | H | - | L | 64 W AC ADAPTER OPERATION | P2 | P4 |
| (4) | H | H | H | 35 W AC ADAPTER OPERATION | P1 | P3 |

※ 35W > P1 > P3, 64W > P2 > P4

INFORMATION PROCESSING APPARATUS, INFORMATION PROCESSING METHOD AND PROGRAM

RELATED APPLICATION DATA

This application is a continuation of U.S. patent application Ser. No. 11/470,683, filed Sep. 7, 2006, the entirety of which is incorporated herein by reference to the extent permitted by law. The present application also claims priority to Japanese Patent Application No. 2005-262058, filed in the Japanese Patent Office on Sep. 9, 2005, which is incorporated herein by reference in its entirety to the extent permitted by law.

BACKGROUND OF THE INVENTION

1. Field of the Invention

This invention relates to an information processing apparatus, an information processing method and a program by which the power consumption can be controlled.

2. Description of the Related Art

Various power control techniques for a portable computer such as, for example, a notebook type personal computer are conventionally known. According to an exemplary one of the power control techniques, when the power consumption of a portable computer exceeds a fixed value determined as a threshold value, the performance of the portable computer is limited to suppress the power consumption. In particular, the power consumption is controlled so as not to exceed a rated power capacity of an AC adapter prescribed for the portable computer. Japanese Patent Laid-open No. 2004-133646 (hereinafter referred to as Patent Document 1) discloses, particularly in the paragraph 0009 of the specification and FIG. 3 and so forth of the drawings, a power control technique of the type described. According to this technique, electric current flowing along a predetermined feed line in an information processing apparatus is detected. Then, if the detected current exceeds a threshold level set in advance based on the rated power capacity of a power supply including an AC adapter and a battery of the information processing apparatus, then a CPU (Central Processing Unit) is driven intermittently thereby to lower the clock frequency. A control method of the type just described is called throttle control, and power saving of the information processing apparatus is achieved by the throttle control.

SUMMARY OF THE INVENTION

However, according to the technique disclosed in Patent Document 1, only one threshold value with which the power control is started can be set to each of the AC adapter and the battery of the power supply apparatus. Accordingly, the technique fails to set an optimum threshold value to each of a plurality of AC adapters having different rated power capacities.

Therefore, it is desirable to provide an information processing apparatus, an information processing method and a program by which optimum power consumption control can be performed in response to the rated power capacity of an AC adapter.

According to an embodiment of the present invention, there is provided an information processing apparatus including: storage means, first outputting means, setting means, detection means, and control means. The storage means stores AC adapter capacity identification information with which a rated power capacity of an AC adapter which can supply power to the information processing apparatus can be identified. The first outputting means outputs the AC adapter capacity identification information stored in the storage means. The setting means sets a threshold value with which control of power consumption of the information processing apparatus is to be started based on the AC adapter capacity identification information outputted from the first outputting means. The detection means detects the power consumption of the information processing apparatus. The control means controls so that, when the power consumption detected by the detection means exceeds the threshold value set by the setting means, the power consumption may become equal to or lower than the threshold value.

The information processing apparatus here is a portable computer such as, for example, a personal computer of the notebook type. Further, the rated power capacity is a power capacity determined in accordance with specifications of the information processing apparatus such as, for example, 35 W, 64 W, 90 W or 120 W. Meanwhile, the threshold value may have two or more values set in response to different rated power capacities.

In the information processing apparatus having the configuration described above, based on the stored AC adapter capacity identification information, the threshold value for the power consumption control can be varied in response to the rated power capacity of each AC adapter. Accordingly, where the AC adapter has a low rated power capacity, it is possible to suppress the performance of the information processing apparatus and achieve reduction in weight and production cost of the AC adapter by setting the threshold value for the power consumption control to a low value corresponding to the low rated power capacity thereby to perform the power saving control with certainty and achieve reduction in weight and production const of the AC adapter. On the other hand, where the AC adapter has a high rated power capacity, it is possible to allow the information processing apparatus to exhibit its performance to the maximum by setting the threshold value for the power consumption control to a high value corresponding to the high rated power capacity. More particularly, for example, the capacity and the weight of an AC adapter whose rated power capacity is 35 W can be suppressed to values lower by approximately 33% than those of another AC adapter whose rated power capacity is 64 W. Also the cost can be suppressed to a lower value by approximately 30%. On the other hand, where the AC adapter whose rated power capacity is 64 W is used to charge a battery, the battery can be charged up in approximately 4.0 hours. Thus, the period of time required for the charging can be decreased when compared with approximately 6.0 hours which are a period of time required where the AC adapter whose rated power capacity is 35 W is used. In other words, an AC adapter which conforms to the need by a user can be provided without modifying the existing hardware of the information processing apparatus.

The information processing apparatus may be configured such that it further includes a re-chargeable battery, and the control means includes first control means for controlling so that the charging power to the battery may be lowered and second control means for controlling so that the clock frequency of the information processing apparatus may be lowered. In the information processing apparatus, the power consumption control can be performed with a higher degree of certainty through the parallel use of the first control means and the second control means.

In this instance, the setting means may set a first threshold value for being used by the first control means and a second threshold value for being used by the second control means.

In the information processing apparatus, if the first and second threshold values are set to different values from each other, then the control by the first or second control means can be performed preferentially in response to a state of the information processing apparatus.

In this instance, the first threshold value may be set higher than the second threshold value. In the information processing apparatus, while the power consumption of the information processing apparatus increases, the power consumption control by the first control section is started first, and then when it becomes impossible to suppress the power consumption by the first control means, the power consumption by the second control means is started. Consequently, when the power consumption assumes a value between the first and second threshold values, the control processing load to the second control means can be suppressed to the minimum by causing only the first control means to operate.

Alternatively, the information processing apparatus may be configured such that it further includes second outputting means. The second outputting means outputs power supply identification information with which it can be identified from which one of the battery and the AC adapter the information processing apparatus is supplied with the power. Thereby, the setting means may set the first threshold value and the second threshold value based on the AC adapter capacity identification information outputted from the first outputting means and the power supply identification information outputted from the second outputting means. In the information processing apparatus, it is possible to set optimum threshold values in response to the supplying source of power to perform the power consumption control appropriately in such a manner that, for example, if the information processing apparatus is supplied with power from the battery, then the threshold values are set to lower values than where the information processing apparatus is supplied with power from the AC adapter so that the driving time of the information processing apparatus is made as long as possible. Also when the power supplying source is changed over from the AC adapter to the battery, the second outputting section monitors the changeover of the power supplying source and issues power supply identification information. Consequently, the threshold values can be varied in response to the power supply identification information.

In this instance, the setting means may set the first threshold value and the second threshold value when the power supply identification information with which it is identified that the information processing apparatus is supplied with the power from the AC adapter is outputted from the second outputting means. But the setting means may set only the second threshold value when the power supply identification with which it is identified that the information processing apparatus is supplied with the power from the battery is outputted from the second outputting means. In the information processing apparatus, where it is supplied with power from the AC adapter, both of the first and second control means are used to perform the power consumption control. However, where the information processing apparatus is supplied with power from the battery, since the battery cannot be charged and the first control means cannot be used for the power consumption control, the first threshold value is not set. However, also in this instance, by setting only the second threshold value, the power consumption control by the second control means can be performed.

The information processing apparatus may be configured such that it further includes third outputting means. The third outputting means outputs extension unit connection information representative of whether or not the information processing apparatus is connected to an extension unit for extending a predetermined function to the information processing apparatus. Thereby, the setting means may set the first threshold value and the second threshold value based on the AC adapter capacity identification information outputted from the first outputting means and the extension unit connection information outputted from the third outputting means.

Here, the extension unit is a docking station or a port replicator. Meanwhile, the predetermined function is, in the case of the docking station, a recording and reproduction function (drive) of a medium such as an FD (floppy (registered trademark) disk), a CD (Compact Disk) or a DVD (Digital Versatile Disk), an external connection function (extension slot) such as a PCI bus or an AGP bus, another external connection function (external connection terminal) such as a serial port, a parallel port, a USB port or an external display output connector, or the like. In the case of the port replicator, the predetermined function is only the external connection functions from among the above-mentioned functions of the docking station. In the information processing apparatus, it is possible to set optimum threshold values in response not only to the AC adapter but also to the connection situation of the extension unit to perform appropriate power consumption control.

In this instance, the setting means may set the first threshold value and the second threshold value, which are set when the extension unit connection information representing that the extension unit is connected is outputted from the third outputting means, higher than the first threshold value and the second threshold value, which are set when the extension unit connection information which represents that the extension unit is not connected is outputted from the third outputting means.

Where the extension unit is connected to the information processing apparatus, also the power consumption increases, and an AC adapter having a comparatively high power capacity is used as the AC adapter. Therefore, by monitoring also the extension unit connection situation and setting, where the extension unit is connected, the threshold values, for example, to higher values, optimum power consumption control can be achieved. For example, when the extension unit is connected, the threshold values are set to 64 W, but when the extension unit is not connected, the threshold values are set to 35 W.

The information processing apparatus may be configured such that the storage means includes a nonvolatile storage device configured to store the AC adapter capacity identification information as part of apparatus identification information with which the information identification is identified. The first output means may include reading out means for reading out the apparatus identification information from the nonvolatile storage device, and extraction means for extracting the AC adapter identification information from within the identification information read out by the reading out means.

Here, the nonvolatile storage device is, for example, a ROM. The AC adapter identification information is written making use of one bit or a plurality of bits of data of several tens of bits indicative of apparatus identification information, for example, upon shipment of the information processing apparatus from a factory. Such data indicative of apparatus identification information are used popularly in information processing apparatus. More particularly, one bit of the apparatus identification information of an information processing apparatus destined for Japan is set to "1" representing that an AC adapter having a rated power capacity of 35 W is used. On the other hand, the corresponding one bit in the apparatus identification information of another information processing apparatus which is destined for a different country than Japan is set to "0" representing that an AC adapter having another rated power capacity higher than 35 W such as, for example, 64 W is used. Further, if two bits or more are utilized for the AC adapter identification information, then it is possible to identify three or more different AC adapters. Consequently, by utilizing part of apparatus identification usually stored in a nonvolatile storage device in an information processing apparatus as the AC adapter capacity identification information, it is possible to identify the rated capacity of any AC adapter readily and set an optimum threshold value to the rated capacity without requiring the cost and labor for provision of a data area for exclusive use or software for exclusive use.

According to another embodiment of the present invention, there is provided an information processing method including the steps of storing AC adapter capacity identification information with which a rated power capacity of an AC adapter which can supply power to an information processing apparatus can be identified, and outputting the stored AC adapter capacity identification information. The information processing method further includes the steps of setting a threshold value with which control of power consumption of the information processing apparatus is to be started based on the outputted AC adapter capacity identification information, detecting the power consumption of the information processing apparatus, and controlling so that, when the detected power consumption exceeds the set threshold value, the power consumption may become equal to or lower than the threshold value.

According to a further embodiment of the present invention, there is provided a program for causing an information processing apparatus to execute the steps of storing AC adapter capacity identification information with which a rated power capacity of an AC adapter which can supply power to an information processing apparatus can be identified, and outputting the stored AC adapter capacity identification information. The program further cause the apparatus to execute the steps of setting a threshold value with which control of power consumption of the information processing apparatus is to be started based on the outputted AC adapter capacity identification information, detecting the power consumption of the information processing apparatus, and controlling so that, when the detected power consumption exceeds the set threshold value, the power consumption may become equal to or lower than the threshold value.

With the information processing apparatus, information processing method and program, optimum power consumption control can be performed in response to the rated power capacity of an AC adapter.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 5 is a view showing a truth table for inputs and an output where the AC adapter capacity identification signal, an extension unit connection signal and a power supply discrimination signal are inputted to a power control level decision section shown in FIG. 2;

DETAILED DESCRIPTION OF THE PREFERRED EMBODIMENT

In the following, a preferred embodiment of the present invention will be described with reference to the drawings.

Figure 1:
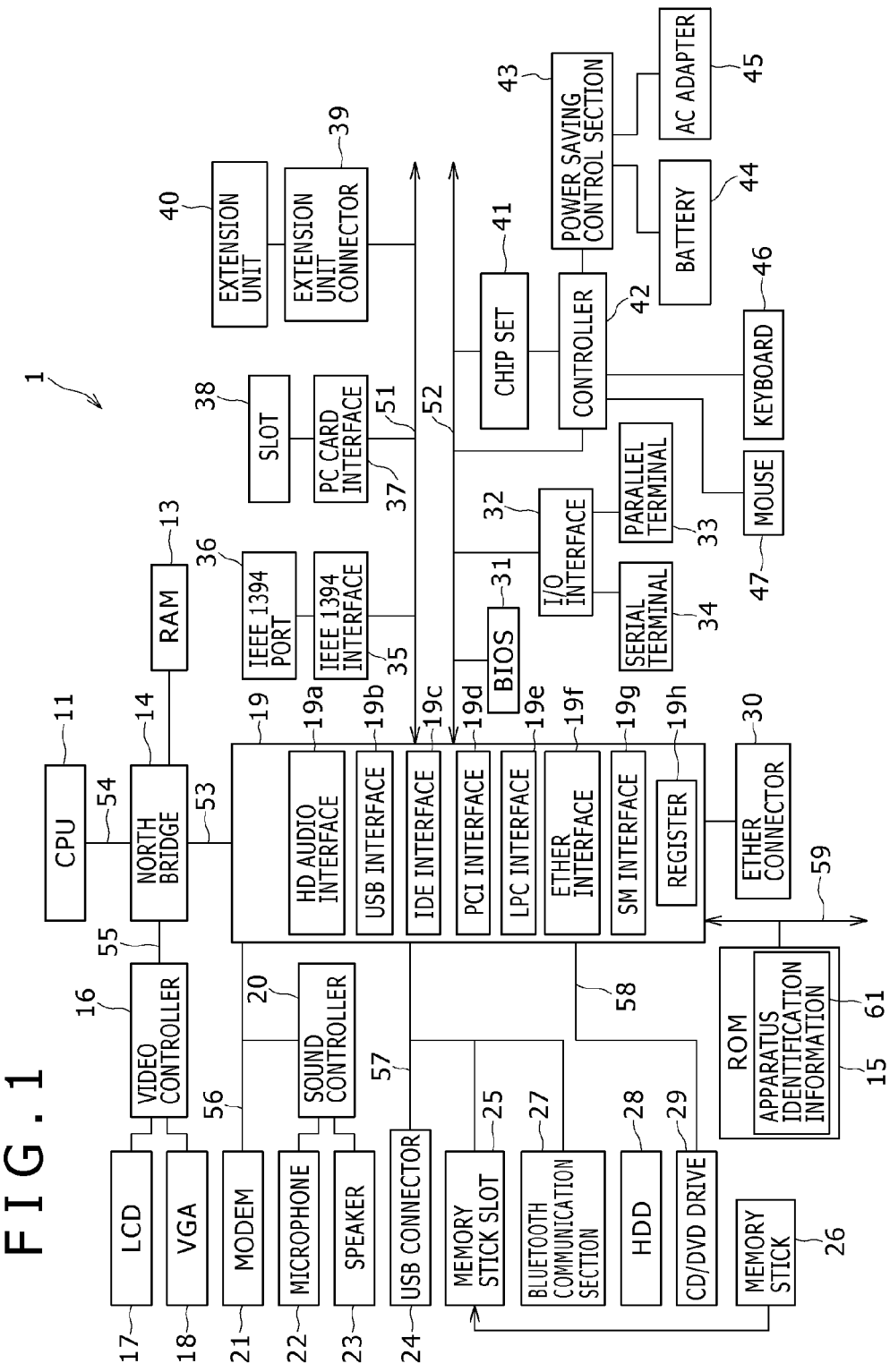
FIG. 1 is a block diagram showing an example of a configuration of a notebook type personal computer to which the present invention is applied.

FIG. 1 is a block diagram showing an example of a configuration of a notebook type personal computer to which the present invention is applied. Referring to FIG. 1, the notebook type personal computer 1 shown includes a CPU 11 which may be a Pentium (registered trademark) processor by Intel and is connected to a front side bus (FSB) 54. Also a north bridge 14 is connected to the FSB 54 and has an accelerated Graphics Port (AGP) 55. The north bridge 14 is connected to a hub interface 53.

The north bridge 14 controls the CPU 11, a random access memory (RAM) 13, which is a main memory, and so forth. Further, the north bridge 14 controls a video controller 16 through the AGP bus 55. The video controller 16 controls a liquid crystal display (LCD) unit 17 or a display unit 18 of the VGA (Video Graphics Array) type (hereinafter referred to as VGA unit 18).

The video controller 16 receives data such as image data, text data and/or the like supplied thereto from the CPU 11 and produces image data corresponding to the received data or stores the received data as they are into a video memory (not shown) built therein. The video controller 16 controls the LCD unit 17 or the VGA unit 18 to display an image corresponding to the image data stored in the video memory. The LCD unit 17 or the VGA unit 18 displays an image, characters and/or the like based on the data supplied thereto from the video controller 16.

It is to be noted that the CPU 11 has a cache memory provided therein which is controlled by the CPU 11 itself and can execute temporary writing or reading out at a rate higher than that of the RAM 13 which may be an SRAM (Static RAM) or the like.

The RAM 13 is formed typically from a DRAM (Dynamic RAM) and stores a program to be executed by the CPU 11 and/or data necessary for action of the CPU 11. In particular, for example, at a point of time when startup is completed, the RAM 13 stores an OS (Operating System), an Internet program and so forth loaded from a hard disk drive (HDD) 28.

The OS is a program for controlling basic action of a computer as represented, for example, by Windows (registered trademark) of Microsoft or Mac OS (registered trademark) of Apple Computer.

The north bridge 14 is connected also to a south bridge 19 through a hub interface 53. The south bridge 19 has built therein various interfaces including an HD audio interface 19a, a USB (Universal Serial Bus) interface 19b, an IDE (Integrated Device Electronics) interface 19c, a PCI (Peripheral Component Interconnect) interface 19d, an LPC (Low Pin Count) interface 19e, an Ether interface 19f and an SM (System Management) interface 19g, and a register 19h.

The south bridge 19 controls various I/O (Input/Output) devices such as devices connected to an HD audio bus 56, a USB bus 57, an IDE bus 58 and an SM bus 59.

A modem 21 and a sound controller 20 are connected to the HD audio bus 56. The modem 21 is connected to a public network and executes a communication process through the public network or the Internet (both not shown). The sound controller 20 fetches sound from a microphone 22 and produces data corresponding to the sound, and then outputs the data to the RAM 13. Further, the sound controller 20 drives a speaker 23 to output sound.

A USB connector 24 is connected to the USB bus 57 of the south bridge 19 such that various USB devices can be connected thereto. Further, a Bluetooth communication section 27 is connected to a memory stick slot 25 through the USB bus 57. Further, a memory stick (trademark) 26 can be loaded into the memory stick slot 25.

The memory stick 26 is a kind of a flash card developed by Sony Corporation which is an assignee of the present application. The memory stick 26 includes a flash memory device which is a kind of an EEPROM (Electrically Erasable and Programmable Read Only Memory) which is a nonvolatile memory which can be electrically rewritable and erasable. In the memory stick 26, the flash memory device is accommodated in a plastic casing of a small size and a small thickness of 21.5 mm deep×50 mm long×2.8 mm thick. The memory stick 26 has 10 pin terminals through which various data of images, sound, music and so forth can be written into and read out from the flash memory device. The Bluetooth communication section 27 performs communication in accordance with the Bluetooth standards.

The USB interface 19b transmits data to an external apparatus connected thereto through the USB bus 57 and receives data from the external apparatus.

The IDE interface 19c includes two IDE controllers including a primary IDE controller and a secondary IDE controller, and a configuration register, and so forth (all not shown).

The HDD 28 is connected to the primary IDE controller through the IDE bus 58. Meanwhile, when an IDE device such as a CD/DVD drive 29, an HDD (not shown) or the like is mounted on another IDE bus, the thus mounted IDE device is electrically connected to the secondary IDE controller. The CD/DVD drive 29 reads out data recorded on an optical disk such as a CD (CD-ROM, CD-R/RW and so forth) or a DVD (DVD-ROM, DVD-RAM, DVD-R/RW, DVD+R/RW or the like) loaded therein and supplies the read out data to the RAM 13. Further, the CD/DVD drive 29 can store data produced by a process of the CPU 11 on the optical disk loaded therein.

An Ether connector 30 is connected to a network such as a LAN (Local Area Network) or the like. The Ether interface 19f transmits data to the network connected to the Ether connector 30 and receives data from the network.

A BIOS (Basic Input Output System) 31, an I/O (Input/Output) interface 32, a chip set 41 and a controller 42 are connected to an LPC bus 52.

The BIOS 31 is a program set in which basic operation commands for the notebook type personal computer 1 are collected, and is stored typically in a ROM (Read Only Memory), an EEPROM, a flash memory or the like. The BIOS 31 controls delivery or inputting and outputting of data between the OS or an application program and a peripheral apparatus. The BIOS controls the delivery of necessary data also upon power saving control hereinafter described.

A parallel terminal 33 and a serial terminal 34 are connected to the I/O interface 32 and perform communication of data with apparatus individually connected thereto.

The controller 42 is connected to the chip set 41. Inputting apparatus such as a keyboard 46 and a mouse 47, a power saving control section 43 and so forth are connected to the controller 42. The chip set 41 can execute control called throttling function which is used principally in order to suppress heat generation of the CPU 11. In particular, the chip set 41 turns the driving of the CPU 11 on and off to perform control of equivalently lowering the clock frequency, that is, intermittently drives the CPU 11 to lower the clock frequency as an average value. It is to be noted that, in the following description, such control of the chip set 41 as just described is hereinafter referred to as throttle control. Further, the chip set 41 controls also an inputting/outputting process of AC adapter capacity identification information hereinafter described.

The controller 42 is formed as a microcomputer and controls such inputting apparatus as the keyboard 46 and the mouse 47 described above. Further, in the present embodiment, the controller 42 makes use of the throttle control of the chip set 41 described above to perform control of the power supplied from an AC adapter 45 together with the power saving control section 43. Further, the power saving control section 43 performs also control of power to be charged from the AC adapter 45 into a battery 44 separately from the throttle control described above. Details of the power saving control section 43 are hereinafter described.

The AC adapter 45 converts AC commercial power supply into DC power supply and supplies the DC power supply to the entire system of the notebook type personal computer 1. In the present embodiment, the AC adapter 45 can apply two kinds of AC adapters 45 having rated power capacities of, for example, 35 W and 64 W. The battery 44 can be charged with power supplied from the AC adapter 45, and when the AC adapter 45 is not connected to the notebook type personal computer 1, the battery 44 supplies the power charged therein to the entire system of the notebook type personal computer 1 while the AC adapter 45 remains connected.

A PC card interface 37, an IEEE (Institute of Electrical and Electronics Engineers) 1394 interface 35 and an extension unit connector 39 are connected to a PCI bus 51.

The IEEE 1394 interface 35 transmits and receives data placed in packets and conforming to the IEEE 1394 standards through an IEEE 1394 port 36.

The PC card interface 37 supplies data received from an apparatus such as a card not shown connected to a slot 38 to the CPU 11 or the RAM 13. Further, the PC card interface 37 outputs data supplied thereto from the CPU 11 to the card connected to the slot 38.

The extension unit connector 39 is a connector such as a docking station or a port replicator used to connect an extension unit 40, which can extend functions of the notebook type personal computer 1, to the notebook type personal computer 1. The docking station has various functions including a recording and reproduction function (drive) for a medium such as, for example, an FD (floppy (registered trademark) disk), a CD or a DVD, an external connection function (extension slot) for a PCI bus, an AGP bus or the like and another external connection function (external connection terminal) such as a serial terminal, a parallel terminal, a USB connector, an external display output connector or the like. The port applicator has only the external connections from among the functions of the docking station. When the extension unit 40 is connected to the notebook type personal computer 1 through the extension unit connector 39, the medium drive described above can read out data stored in a medium loaded therein and supply the data to the RAM 13, and can store data produced by a process of the CPU 11 into the medium loaded therein. Various buses built in the extension unit have functions similar to those of the PCI bus 51, AGP bus 55 and so forth described hereinabove, and also a serial terminal, a parallel terminal, a USB connector and so forth of the extension unit have functions similar to those of the serial terminal 34, parallel terminal 33, USB connector 24 and so forth respectively. Thus, the extension unit can perform a process for delivery of various data.

A ROM 15 is connected to the SM bus 59. Apparatus identification information 61 for the identification of the notebook type personal computer 1 is stored in the ROM 15 and includes AC adapter capacity identification information for the identification of the rated power capacity of the AC adapter 45.

Incidentally, CPUs having a high frequency and having comparatively high power consumption have been and are being popularized in recent years. Also notebook type personal computers as portable mobile computers having a configuration similar to that of the notebook type personal computer 1 shown in FIG. 1 have been and are being popularized. The notebook type personal computer 1 includes not only the AC adapter 45 but also the battery 44 built therein as a power supply so that the notebook type personal computer 1 is formed as a portable apparatus.

Further, the AC adapter 45 and the battery 44 are designed so as to cope with maximum power consumption in a state wherein all of the CPU 11 and other chips (not shown) incorporated in the notebook type personal computer 1, the CD/DVD drive 29, the IEEE 1394 interface 35 and so forth operate all in their maximum power consumption at the same time. As design specifications for the AC adapter 45 and the battery 44, a rated power capacity value, a peak power value, a peak power duration, a ratio (Duty Rate) between a period within which the AC adapter 45 or battery 44 operates within the rated power capacity and another period within which the AC adapter 45 or battery 44 operates outside the rated power capacity, and so forth are defined.

Where the CPU 11 having such a high frequency and high power consumption as described above is incorporated in the notebook type personal computer 1, in order to elongate the driving time period by the battery 44 or achieve miniaturization of the AC adapter 45 or the battery 44, it is necessary to achieve reduction of the power consumption of the entire notebook type personal computer 1.

To this end, the notebook type personal computer 1 according to the present embodiment first detects total current, that is, actually flowing current, consumed by the notebook type personal computer 1. Then, if the detected level of the current exceeds a threshold value set in advance, then two different control schemes are performed including throttle control of lowering the clock frequency of the CPU 11 by the throttling function. The other control scheme is battery charging control of controlling the amount of current to be charged into the battery 44 through the AC adapter 45. Hereinafter, the two control scheme is described as a power saving control. It should be noted that the way to lower the clock frequency of the CPU 11 is not limited to by the throttle control scheme. For example, the clock frequency itself can be set lower.

However, since the rated power capacity of the AC adapter 45 differs depending upon the specifications of the notebook type personal computer 1, if only one value can be set as the threshold value irrespective of whether the AC adapter 45 has a high rated power capacity or a low rated power capacity, then the performance of the notebook type personal computer 1 cannot be exhibited to the utmost. Further, since the design of hardware of the notebook type personal computer 1 is modified depending upon the rated power capacity of the AC adapter 45, a cost and labor are required.

Therefore, in the power saving control in the present embodiment, the threshold value can be set to an optimum value in response to the rated power capacity of the AC adapter 45. In addition, the threshold value can be set also in response to the situation of use of the notebook type personal computer 1 such as whether the battery 44 is used as a power supply, that is, the AC adapter 45 is connected to the notebook type personal computer 1 or the extension unit 40 is connected to the notebook type personal computer 1. In the following, the power saving control is described.

Figure 2:
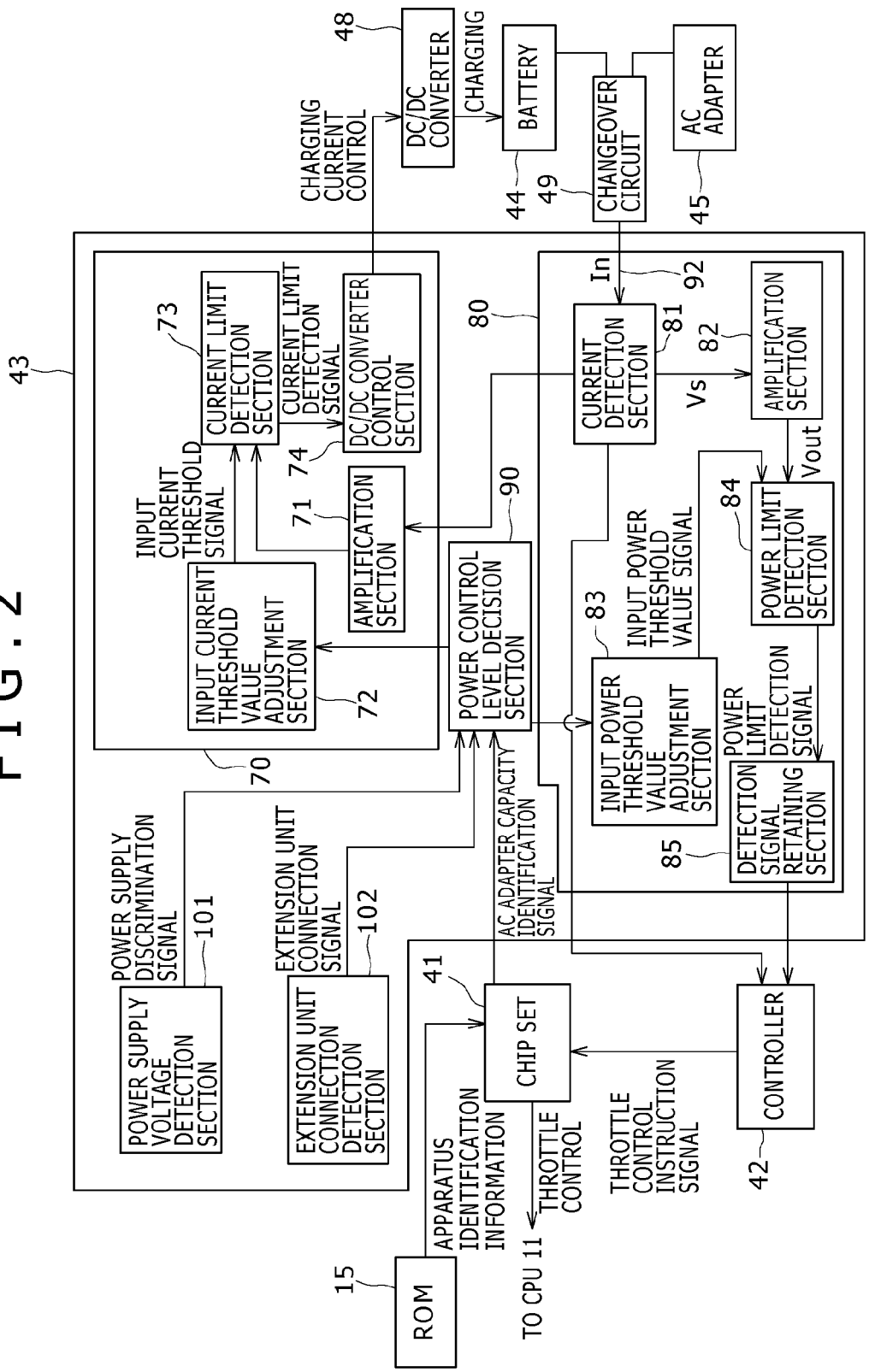
FIG. 2 is a block diagram showing an example of a configuration of a principal portion of the notebook type personal computer which executes power saving control.

FIG. 2 shows an example of a configuration of a principal portion of the notebook type personal computer 1 of the present embodiment which executes the power saving control. Referring to FIG. 2, the power saving control in the present embodiment is executed by the power saving control section 43, a DC/DC converter 48, a changeover circuit 49, the battery 44, an AC adapter 45, the chip set 41, the controller 42 and the ROM 15 as well as the CPU 11 (refer to FIG. 1) which is not shown in FIG. 2.

The power saving control section 43 includes a battery charging control section 70, a throttle control section 80, a power control level decision section 90, a power supply voltage detection section 101 and an extension unit connection detection section 102.

Figure 3:
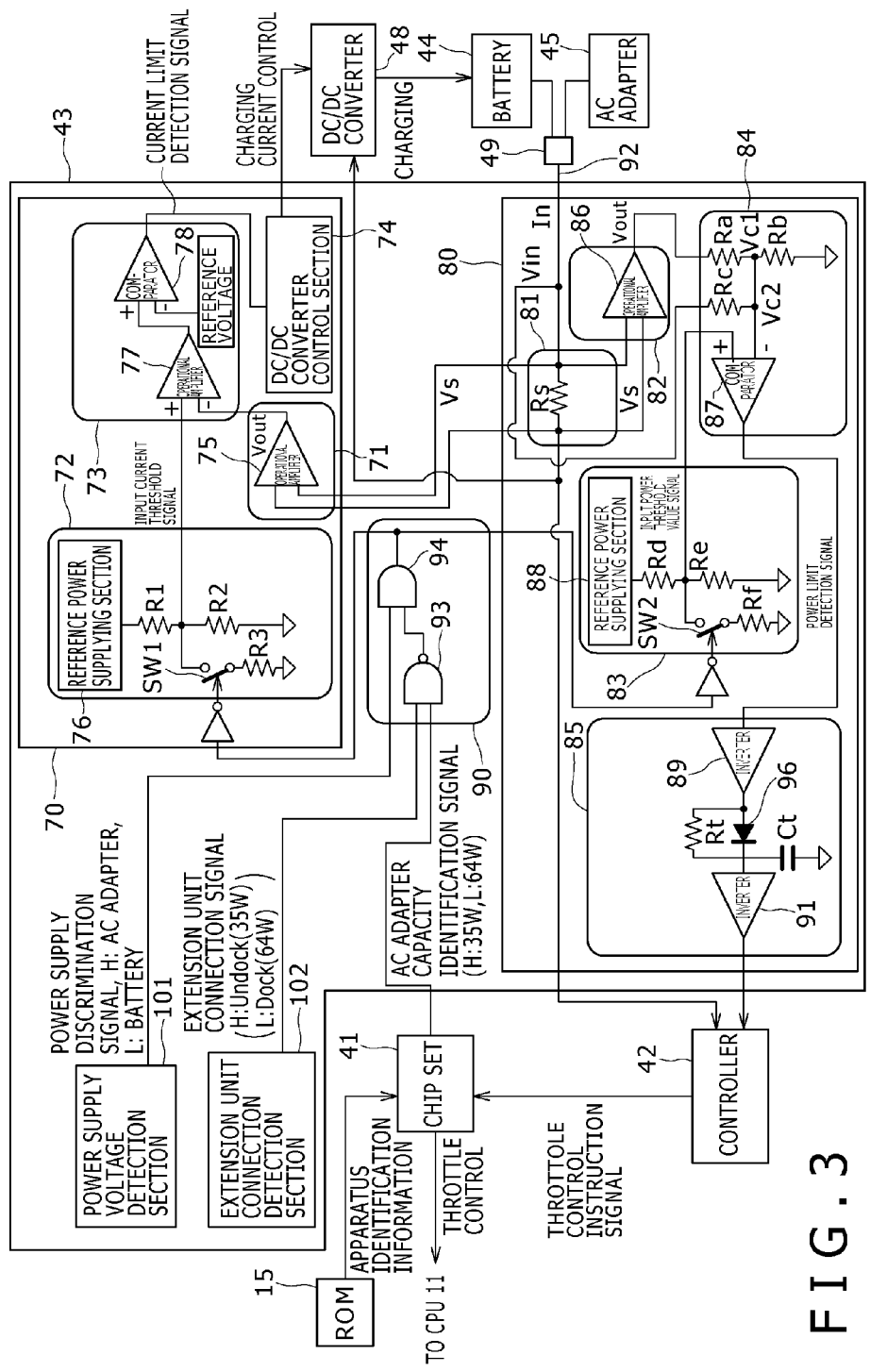
FIG. 3 is a block diagram showing an example of a detailed configuration of a power saving control section shown in FIG. 2.

FIG. 3 shows an example of a detailed configuration of the power saving control section 43 shown in FIG. 2. Details of the power saving control section 43 are described below with reference to FIG. 2.

The power control level decision section 90 sets a threshold value with which a power saving control process is to be started in each of the throttle control section 80 and the battery charging control section 70 based on signals outputted from the chip set 41, extension unit connection detection section 102 and power supply voltage detection section 101. The power control level decision section 90 includes a NAND circuit 93 for receiving, as inputs thereto, an AC adapter capacity identification signal outputted from the chip set 41 and an extension unit connection signal outputted from the extension unit connection detection section 102. The power control level decision section 90 further includes an AND circuit 94 for receiving, as inputs thereto, an output of the NAND circuit 93 and a power supply discrimination signal outputted from the power supply voltage detection section 101. A logical AND signal of the AND circuit 94 is outputted as a threshold signal to an input current threshold value adjustment section 72 of the battery charging control section 70 and an input power threshold value adjustment section 83 of the throttle control section 80.

As described hereinabove, the apparatus identification information for the identification of the specification type of the notebook type personal computer 1 is stored in the ROM 15. The apparatus identification information includes AC adapter capacity identification information for the identification of the rated power capacity (35 W or 64 W mentioned hereinabove) of the AC adapter 45. The chip set 41 produces an AC adapter capacity identification signal based on the AC adapter capacity identification information and outputs the AC adapter capacity identification signal to one of input terminals of the NAND circuit 93 of the power control level decision section 90. In the present embodiment, the AC adapter capacity identification signal has a High level for 35 W and a Low level for 64 W.

Figure 4A:
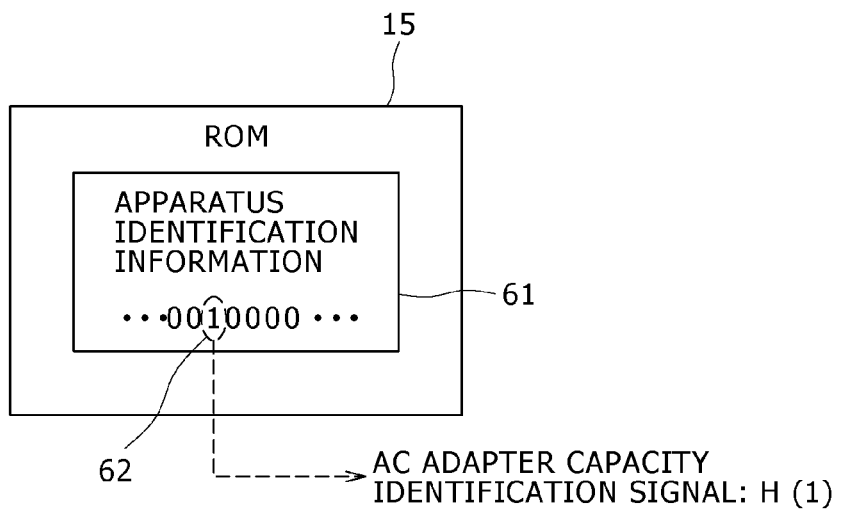
FIGS. 4A and 4B are block diagrams conceptively illustrating a production process of an AC adapter identification signal.
Figure 4B:
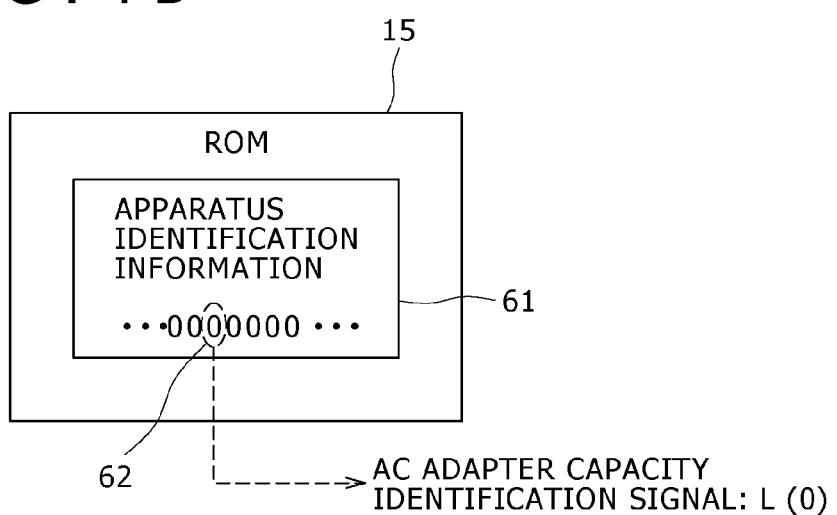

FIGS. 4A and 4B illustrate a concept of a process of producing an AC adapter capacity identification signal from apparatus identification information. As seen in FIGS. 4A and 4B, then apparatus identification information 61 of several tens bits such as, for example, 32 bits for the identification of the model, specifications and so forth of the notebook type personal computer 1 is written in the ROM 15. The writing of the apparatus identification information 61 is performed typically upon shipment of the notebook type personal computer 1 from a factory. In the present embodiment, the notebook type personal computer 1 uses, for example, one bit of the apparatus identification information 61 as AC adapter capacity identification information 62. It is to be noted that, since the rated power capacity of the AC adapter 45 is set in response to the destination of shipment of the notebook type personal computer 1, that is, whether the notebook type personal computer 1 is to be shipped to Japan or a different country, when the notebook type personal computer 1 is to be shipped from a factory in Japan, the AC adapter capacity identification information 62 is written for each destination country of the shipment. For example, where the notebook type personal computer 1 is destined for Japan, the rated power capacity of the AC adapter 45 packaged together with the notebook type personal computer 1 is set to 35 W and the one bit of the AC adapter capacity identification information 62 described hereinabove is set to "1" as seen in FIG. 4A. On the other hand, if the notebook type personal computer 1 is destined for a different country, then the rated power capacity of the AC adapter 45 is set to 64 W and the one bit of the AC adapter capacity identification information 62 is set to "0" as seen in FIG. 4B.

In order for the notebook type personal computer 1 to produce the AC adapter capacity identification signal, the apparatus identification information 61 in which the AC adapter capacity identification information 62 is set as described hereinabove is read out from the ROM 15 by the BIOS 31 connected to the LPC bus 52. Then, the BIOS 31 extracts the AC adapter capacity identification information 62 from the apparatus identification information and writes the AC adapter capacity identification information 62 into the register 19h of the south bridge 19. Then, the south bridge 19 outputs the AC adapter capacity identification information 62 written in the register 19h to the chip set 41. The chip set 41 outputs the AC adapter capacity identification information 62 as the AC adapter capacity identification signal described hereinabove to the power control level decision section 90. For example, where the AC adapter 45 of the rated power capacity of 35 W is packaged together with the notebook type personal computer 1, the chip set 41 outputs the AC adapter capacity identification signal of the "High" level to the NAND circuit 93 of the power control level decision section 90. However, where the AC adapter 45 of the rate power capacity of 64 W is packaged, the chip set 41 outputs the AC adapter capacity identification signal of the "Low" level to the NAND circuit 93.

Referring back to FIG. 3, the extension unit connection detection section 102 detects whether or not the notebook type personal computer 1 is connected to the extension unit 40. In the following description, the state in which the notebook type personal computer 1 is connected is referred to as "Dock", and the state in which the notebook type personal computer 1 is not connected is referred to as "Undock". In particular, the extension unit connection detection section 102 monitors the connection situation of the extension unit 40 to the notebook type personal computer 1 and produces an extension unit connection signal based on the connection signal from the extension unit 40. The extension unit connection signal in this instance has the "High" level for the Undock but has the "Low" level for the Dock. The extension unit connection detection section 102 outputs the produced extension unit connection signal to the other input terminal of the NAND circuit 93 of the power control level decision section 90. It is to be noted that, in the notebook type personal computer 1 of the present embodiment, where the extension unit 40 is not connected, an AC adapter having the rated power capacity of 35 W is used as the AC adapter 45, but where the extension unit 40 is connected, another AC adapter having the rated power capacity of 64 W is used as the AC adapter 45.

The power supply voltage detection section 101 detects from which one of the AC adapter 45 and the battery 44 the notebook type personal computer 1 is supplied with power. In particular, the power supply voltage detection section 101 is formed, for example, from a comparator or the like (not shown) provided on a predetermined feed line of the notebook type personal computer 1 and checks the difference between a voltage of current flowing along the feed line and a reference voltage set in advance based on the rated voltages of the AC adapter 45 and the battery 44. Here, the rated voltage of the AC adapter 45 is higher than the rated voltage of the battery 44. The power supply voltage detection section 101 decides based on the difference from which one of the AC adapter 45 and the battery 44 the notebook type personal computer 1 is supplied with power. Then, the power supply voltage detection section 101 produces a power supply discrimination signal based on the decision and outputs the power supply discrimination signal to one of the input terminals of the AND circuit 94 of the power control level decision section 90. The power supply discrimination signal has the "High" level where the power supplying source is the AC adapter 45 but has the "Low" level where the power supplying source is the AC adapter 45.

The throttle control section 80 includes a current detection section 81, an amplification section 82, an input power threshold value adjustment section 83, a power limit detection section 84 and a detection signal retaining section 85. The throttle control section 80 controls the chip set 41 to perform the throttle control for lowering the clock frequency of the CPU 11.

The current detection section 81 is formed as a detection resistor Rs. The detection resistor Rs detects current In supplied from the AC adapter 45 or the battery 44 through the changeover circuit 49 and flowing through a feed line 92 as a voltage across the detection resistor Rs. In particular, the current detection section 81 detects the current In as the voltage Vs defined by the following expression:

$$Vs = In \times Rs \qquad (1)$$

Where the AC adapter 45 is not connected to the notebook type personal computer 1 through the changeover circuit 49, the current In supplied from the AC adapter 45 is detected, but where the AC adapter 45 is connected to the notebook type personal computer 1 through the changeover circuit 49, the current In supplied from the AC adapter 45 is detected.

The amplification section 82 includes, for example, an operational amplifier 86 or the like and amplifies the voltage Vs detected by the current detection section 81 by a predetermined gain G, that is, multiplies the voltage Vs by G to obtain a output voltage Vout. Then, the amplification section 82 outputs the output voltage Vout to the power limit detection section 84. In other words, the output voltage Vout of the amplification section 82 has a value defined by the following expression (2):

$$Vout = G \times Vs \qquad (2)$$

where G is an arbitrary integer. In the present example, G is set, for example, to G=20.

The power limit detection section 84 includes, for example, resistors Ra, Rb and Rc and a comparator 87. The power limit detection section 84 receives the output voltage Vout of the amplification section 82 as an input thereto and arithmetically operates the level of the current In flowing along the feed line 92 based on the inputted voltage Vout. The current flowing along the feed line 92 here is total current consumed by the notebook type personal computer 1. If the power level of the current In exceeds a threshold value inputted from the input power threshold value adjustment section 83, then the power limit detection section 84 outputs a signal representing this fact to the detection signal retaining section 85. The signal is hereinafter referred to as power limit detection signal.

The resistors Ra to Rc are connected at one terminal thereof to the negated input (−1) of the comparator 87. The resistors Ra and Rb connected to the negated input (−1) of the comparator 87 are further connected at the one terminal thereof to each other. Meanwhile, the resistor Ra is connected at the other terminal thereof to an output terminal of the amplification section 82, that is, the operational amplifier 86, and the resistor Rb is grounded at the other terminal thereof. A node between the resistors Ra and Rb is connected to the negated input (−1) of the comparator 87 and one terminal of the resistor Rc. The resistor Rc is connected at the other terminal thereof to a predetermined portion between the AC adapter 45 and the current detection section 81, that is, a portion at which the output voltage Vin of the AC adapter 45 is maintained.

The input power threshold value adjustment section 83 includes, for example, a reference power supplying section 88, resistors Rd, Re and Rf and a switch SW2. The resistors Rd and Re are connected at one terminal thereof to each other, and the resistor Rd is connected at the other terminal thereof to the reference power supplying section 88 while the resistor Re is grounded at the other terminal thereof. Meanwhile, the resistor Rf is connected at one terminal thereof to the switch SW2 and grounded at the other terminal thereof. In other words, the resistor Rf is connected in parallel to a series circuit of the resistors Rd and Re.

The input power threshold value adjustment section 83 receives a threshold value signal outputted as a logical AND value of the AND circuit 94 of the power control level decision section 90 and having a value of 0 or 1, and adjusts the threshold value for the input power based on the threshold value signal. Then, the input power threshold value adjustment section 83 outputs the adjusted threshold value to the power limit detection section 84. In particular, the input power threshold value adjustment section 83 changes over the switch SW2 between on and off based on the threshold value of 1 or 0 to adjust the fixed voltage supplied from the reference power supplying section 88 in accordance with a resistance voltage dividing ratio between the resistors Rd and Re or a resistance voltage dividing ratio between a combined resistance of the resistors Re and Rf and the resistance of the resistor Rd. Then, the input power threshold value adjustment section 83 inputs the adjusted voltage as an input power threshold value signal to the non-negated input terminal (+) of the comparator 87 of the power limit detection section 84.

The power limit detection section 84 compares the voltage of the input power threshold value signal inputted to the non-negated input (+) of the comparator 87 and a voltage Vc at an intermediate point which is addition of current of an output voltage of the operational amplifier 86 of the amplification section 82 and the output voltage Vin of the AC adapter 45. Then, if the voltage Vc is higher than the threshold value, then the power limit detection section 84 outputs the power limit detection signal to the detection signal retaining section 85. While current from one of the AC adapter 45 and the battery 44 is supplied to the current detection section 81 as described hereinabove, the rated voltage of the AC adapter 45 is generally higher than the rated voltage of the battery 44. Therefore, the ongoing voltage varies depending upon from which one of the AC adapter 45 and the battery 44 power the notebook type personal computer 1 is supplied with power. Therefore, the power of the notebook type personal computer 1 cannot be detected accurately only if the current is detected. Thus, also the output voltage Vin across the resistor Rc is added, and therefore, a value detected as a power value determined with a variation in voltage taken into consideration and the threshold value described above are compared with each other.

The detection signal retaining section 85 includes a circuit including an inverter 89, a diode 96, a resistor Rt and a capacitor Ct, and an inverter 91. In particular, while the detection signal retaining section 85 supplies the power limit detection signal outputted from the comparator 87 of the power limit detection section 84 to the controller 42, it keeps the outputting of the power limit detection signal during a retaining time period T1 corresponding to a time constant Rt/Ct. The retaining time period T1 is hereinafter described.

The controller 42 enables the throttle control of the chip set 41 when it receives the power limit detection signal from the throttle control section 80. Then, the controller 42 thereafter keeps the throttle control of the chip set 41, and then cancels the throttle control when a predetermined control keeping timing period T3 elapses after the throttle control is started. It is to be noted that details of the control keeping timing period T3 are hereinafter described.

The chip set 41 not only executes a production process of the AC adapter capacity identification signal but also executes or stops the throttle control under the control of the controller 42 thereby to control the power consumption of the notebook type personal computer 1.

It is to be noted that the method by which the controller 42 enables the throttle control is not limited specifically. However, in the present embodiment, for example, the controller 42 outputs a throttle control instruction signal illustrated in FIGS. 2 and 3 to enable the throttle control of the chip set 41. In particular, while the controller 42 keeps outputting of the throttle control instruction value, that is, while the chip set 41 receives the throttle control instruction value, the chip set 41 keeps the throttle control. However, when the controller 42 stops the outputting of the throttle control instruction signal, that is, when the chip set 41 does not receive the throttle control instruction signal any more, the chip set 41 determines that an instruction to cancel the throttle control is received. Consequently, the chip set 41 stops the execution of the throttle control.

The battery charging control section 70 takes charge of control of the power to be charged into the battery 44 through the DC/DC converter 48. The battery charging control section 70 includes an amplification section 71, an input current threshold value adjustment section 72, a current limit detection section 73 and a DC/DC converter control section 74.

The amplification section 71 includes an operational amplifier 75 or the like and amplifies the voltage Vs detected by the current detection section 81 of the throttle control section 80 by the predetermined gain G, that is, multiplies the voltage Vs by G. Then, the amplification section 71 outputs the amplified detected voltage as a voltage Vout to the current limit detection section 73. It is to be noted that, since the battery charging control section 70 cannot execute processing while the notebook type personal computer 1 is operating with power supplied from the battery 44, the voltage Vs inputted to the amplification section 71 becomes a voltage of the current In supplied only from the AC adapter 45.

The current limit detection section 73 includes, for example, an operational amplifier 77 and a comparator 78. The operational amplifier 77 receives the output voltage Vout of the amplification section 71 as an input thereto at the negated input (−) thereof and amplifies the difference between the received voltage Vout and a voltage of the input current threshold value signal inputted to the non-negated input (+) thereof from the input current threshold value adjustment section 72. If the current In is high, then the output of the operational amplifier 77 is low, but if the current In is low, then the output of the operational amplifier 77 is high. The comparator 78 compares the voltage inputted to the non-negated input (+) thereof from the operational amplifier 77 and the reference voltage inputted to the negated input (−) thereof with each other. Then, when the input voltage from the operational amplifier 77 is lower than the reference voltage, that is, when the input current is high, the comparator 78 outputs a current limit detection signal to the DC/DC converter control section 74. It is to be noted that, since the battery charging control section 70 executes the process only when power is supplied thereto from the AC adapter 45 as described hereinabove and the AC adapter 45 generally has a fixed voltage, there is no necessity to take the variation of the voltage into consideration, different from the power limit detection section 84 of the throttle control section 80. Accordingly, in the comparison by the comparator 78, the comparison between the current value detected by the current detection section and the input current threshold value signal described above is equivalent to the comparison between the power values.

The input current threshold value adjustment section 72 includes, for example, a reference power supplying section 76, resistors R1, R2 and R3 and a switch SW1. The resistors R1 and R2 are connected at one terminal thereof to each other, and the resistor R1 is connected at the other terminal thereof to the reference power supplying section 76 while the resistor R2 is grounded at the other terminal thereof. Meanwhile, the resistor R3 is connected at one terminal thereof to the switch SW1 and grounded at the other terminal thereof. In other words, the resistor R3 is connected in parallel to a series circuit of the resistors R1 and R2.

The input current threshold value adjustment section 72 receives, as an input thereto, a threshold value signal outputted as a logical AND value of the AND circuit 94 of the power control level decision section 90 and representing one of 1 or 0 similarly to the input power threshold value adjustment section 83 of the throttle control section 80. The input current threshold value adjustment section 72 then adjusts the threshold value for input current based on the threshold value signal and outputs the adjusted threshold value to the current limit detection section 73. In particular, the input current threshold value adjustment section 72 changes over the switch SW1 between on and off based on the threshold value of 1 or 0 to adjust the fixed voltage supplied from the reference power supplying section 76 at a resistance voltage dividing ratio between the resistors R1 and R2, that is, at a resistance voltage dividing ratio between the combined resistance of the resistors R2 and R3 and the resistance of the resistor R1. Then, the input current threshold value adjustment section 72 inputs the adjusted voltage as an input current threshold value signal to the non-negated input terminal (+) of the operational amplifier 77 of the current limit detection section 73.

The DC/DC converter 48 includes an FET (Field Effect Transistor) switch (not shown). The switch is switched ON/OFF at a cycle of, for example, approximately 400 kHz to convert the input voltage after it is supplied from the AC adapter 45 and passes through the chip set 41 to charge the battery 44.

The DC/DC converter control section 74 controls the switching action of the FET switch described above. When the current In exceeds the threshold value and consequently a current limit detection signal is outputted from the current limit detection section 73, the DC/DC converter control section 74 does not perform the switching action described above and hence does not perform voltage conversion to suppress charging of the battery 44 thereby to suppress the power consumption of the notebook type personal computer 1.

In particular, if the input voltage from the operational amplifier 77 is lower than the reference value, that is, if the input voltage is high, then a signal of the "Low" level is inputted to the DC/DC converter control section 74. Consequently, the switching action by the DC/DC converter 48 is suppressed thereby to restrict the charging current. On the contrary, if the input voltage from the operational amplifier 77 exceeds the reference voltage, that is, if the input voltage is low, then a signal of the "High" level is inputted to the DC/DC converter control section 74. Consequently, ordinary charging action by the DC/DC converter 48 is performed.

Now, a threshold value setting process of the power control level decision section 90 is described. FIG. 5 illustrates a truth table for inputs and an output where the AC adapter identification signal, extension unit connection signal and power supply discrimination signal are inputted to the power control level decision section 90 shown in FIG. 2. As described hereinabove, it is assumed that, in the present embodiment, two different AC adapters having the different rated power capacities of 35 W and 64 W depending upon the destination of shipment of the notebook type personal computer 1 are used as the AC adapter 45.

As seen in FIG. 5, where the power supply discrimination signal inputted from the power supply voltage detection section 101 is "L", that is, has the "Low" level as seen in (1) of FIG. 5, the notebook type personal computer 1 operates with power supplied from the battery 44. Therefore, in order to allow the driving time of the notebook type personal computer 1 by the battery 44 to continue as long as possible, the threshold value with which the throttle control is to be started is set to a value for 35 W, but not to a threshold value with which the battery charging control is to be started. The threshold value with which the throttle control is to be started is denoted by "THt", and the threshold value for 35 W is denoted by "P1" while the threshold value with which the battery charging control is to be started is denoted by "THc".

When the power supply discrimination signal is "H" and the AC adapter capacity identification signal is "L" as seen in (2) of FIG. 5 or the extension unit connection signal is "L" as seen in (3) of FIG. 5, the notebook type personal computer 1 operates with the AC adapter 45 of 64 W. This is because, where the extension unit 40 is connected, an AC adapter having a low rated power capacity cannot be used. Therefore, the threshold value THt is set to a value for 64 W and the threshold value THc is set to a value for 64 W. The former value is hereinafter referred to as "value P2", and the latter value is hereinafter referred to as "value P4". It is to be noted that, where the notebook type personal computer 1 is destined for a different country than Japan, not only when the extension unit 40 is connected but also when the extension unit 40 is not connected, the same AC adapter 45 whose rated power capacity of 64 W is used.

Where all of the power supply discrimination signal, AC adapter capacity identification signal and extension unit connection signal are "H", since the notebook type personal computer 1 operates with the AC adapter 45 whose rated power capacity is 35 W, the threshold value THt is set to the value P1 for 35 W and the threshold value THc is set to another value for 35 W. The latter value is hereinafter referred to as "value P3".

Figure 6:
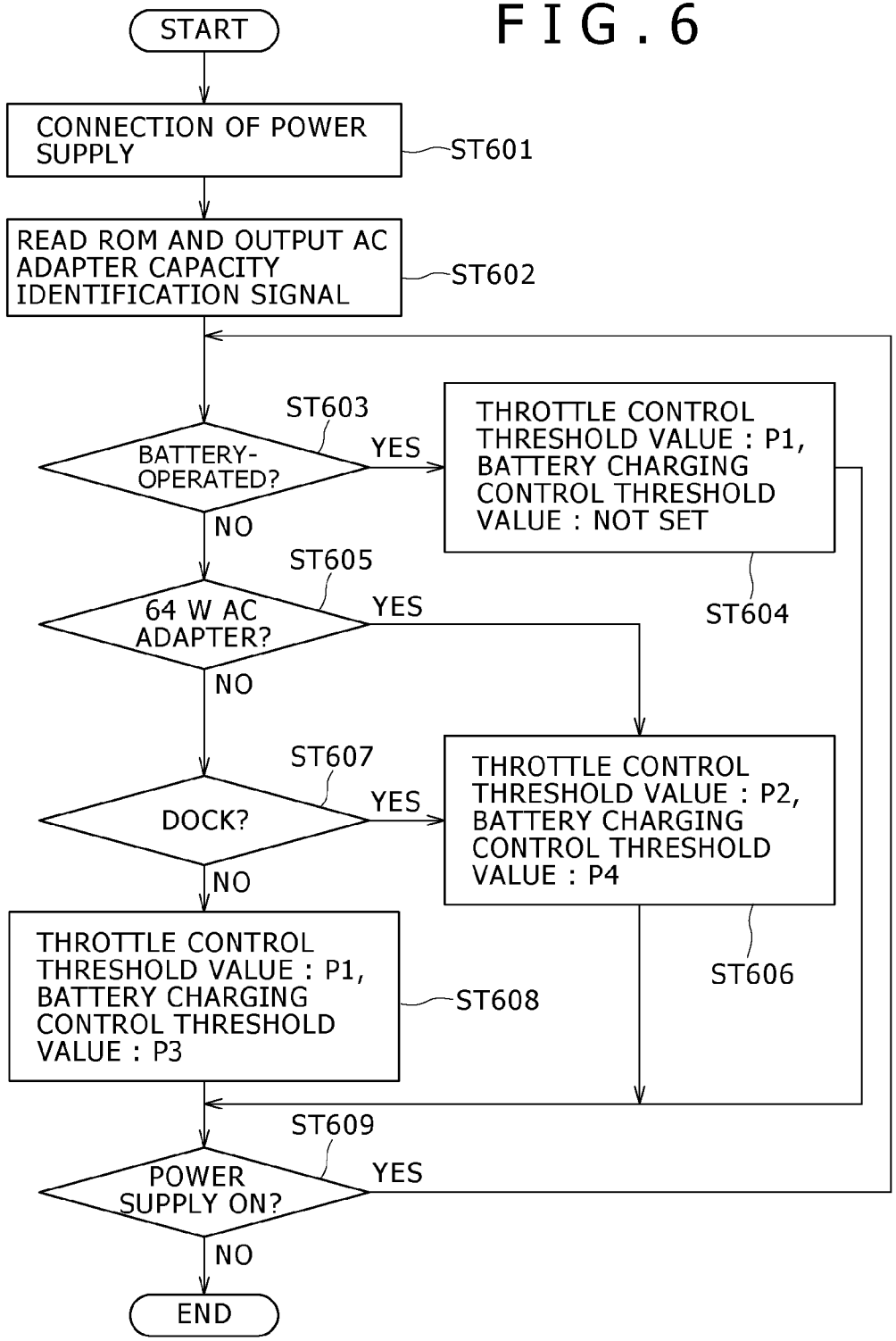
FIG. 6 is a flow chart illustrating a flow of a setting process of a threshold value in the notebook type personal computer.

FIG. 6 illustrates a flow of a setting process of the threshold values mentioned hereinabove. Referring to FIG. 6, after the power supply to the notebook type personal computer 1 is first made available (step ST601), the BIOS 31 extracts the AC adapter capacity identification information 62 from within the apparatus identification information 61 stored in the ROM 15 and writes the AC adapter capacity identification information 62 into the register 19h of the south bridge 19. The south bridge 19 outputs the AC adapter capacity identification information 62 to the chip set 41, and the chip set 41 outputs the AC adapter capacity identification information 62 as an AC adapter capacity identification signal to the power control level decision section 90 (step ST602).

Then, the power control level decision section 90 refers to the power supply discrimination signal inputted thereto from the power supply voltage detection section 101 to decide whether or not the notebook type personal computer 1 operates with a battery (step ST603). If the notebook type personal computer 1 operates with a battery (Yes at step ST603), then the power control level decision section 90 sets the threshold value THt for the throttle control to the value P1 but does not set the threshold value THc (step ST604).

On the other hand, if the notebook type personal computer 1 does not operate with a battery (No at step ST603), then the power control level decision section 90 decides whether or not the notebook type personal computer 1 operates with the AC adapter 45 whose rated power capacity is 64 W (step ST605). If the notebook type personal computer 1 operates with the AC adapter 45 whose rated power capacity is 64 W (Yes at step ST605), then the power control level decision section 90 sets the threshold value THt to the value P2 and sets the threshold value THc to the value P4 (step ST606).

On the other hand, if it is decided at step ST605 that the notebook type personal computer 1 does not operate with the AC adapter 45 whose rated power capacity is 64 W, then the power control level decision section 90 decides whether or not the notebook type personal computer 1 is connected to the extension unit 40 (step ST607). If the notebook type personal computer 1 is connected to the extension unit 40 (Yes at step ST607), then also in this instance, the power control level decision section 90 sets the threshold value THt to the value P2 and sets the threshold value THc to the value P4 (step S606).

However, if the notebook type personal computer 1 is not connected to the extension unit 40 (No at step ST607), or in other words, if none of the conditions described above are satisfied, then the power control level decision section 90 sets the threshold value THt to the value P1 and sets the threshold value THc to the value P3 (step ST608).

The series of actions described above is repeated while the power supply to the notebook type personal computer 1 remains on (Yes at step ST609). Then, when the power supply is turned off (No at step ST609), the processing is ended.

In this manner, the threshold values THt and THc are set in response to the rated power capacity of the AC adapter 45 and are changed also in response to such use situations of which one of the battery 44 and the AC adapter 45 is used as a power supply by the notebook type personal computer 1 and whether or not the notebook type personal computer 1 is connected to the extension unit 40. Since also such use situations are normally monitored, every time any of the use situations varies such as, for example, every time the AC adapter 45 is connected or every time the extension unit 40 is connected, the threshold values can be varied suitably.

It is to be noted that the threshold values THt (P1 and P2) for the throttle control illustrated in FIG. 5 are set to rather low values than those for the rated power capacities (35 W and 64 W) in response to the rated power capacity of the AC adapter 45. Further, the threshold values THc (P3 and P4) for the battery charging control are set to rather low values than the threshold values THt (P1 and P3) of the throttle control. In particular, the values to be set as the threshold values (THt and THc) in response to the rated power capacities of the AC adapter 45 have a relationship given by the following expressions:

$$35 \text{ W} > P1 > P3, 64 \text{ W} > P2 > P4$$

Consequently, the battery charging control is started earlier than the throttle control, and the throttle control is started when the power supply cannot be supplied any more by the battery charging control.

The input current threshold value adjustment section 72 of the battery charging control section 70 and the input power threshold value adjustment section 83 of the throttle control section 80 vary the input current threshold value signal and the input power threshold value signal based on the threshold value signals outputted based on the threshold values set as described above. Then, the input current threshold value adjustment section 72 and the input power threshold value adjustment section 83 output the input current threshold value signal and the input power threshold value signal varied in this manner to the current limit detection section 73 and the power limit detection section 84, respectively.

Figure 7:
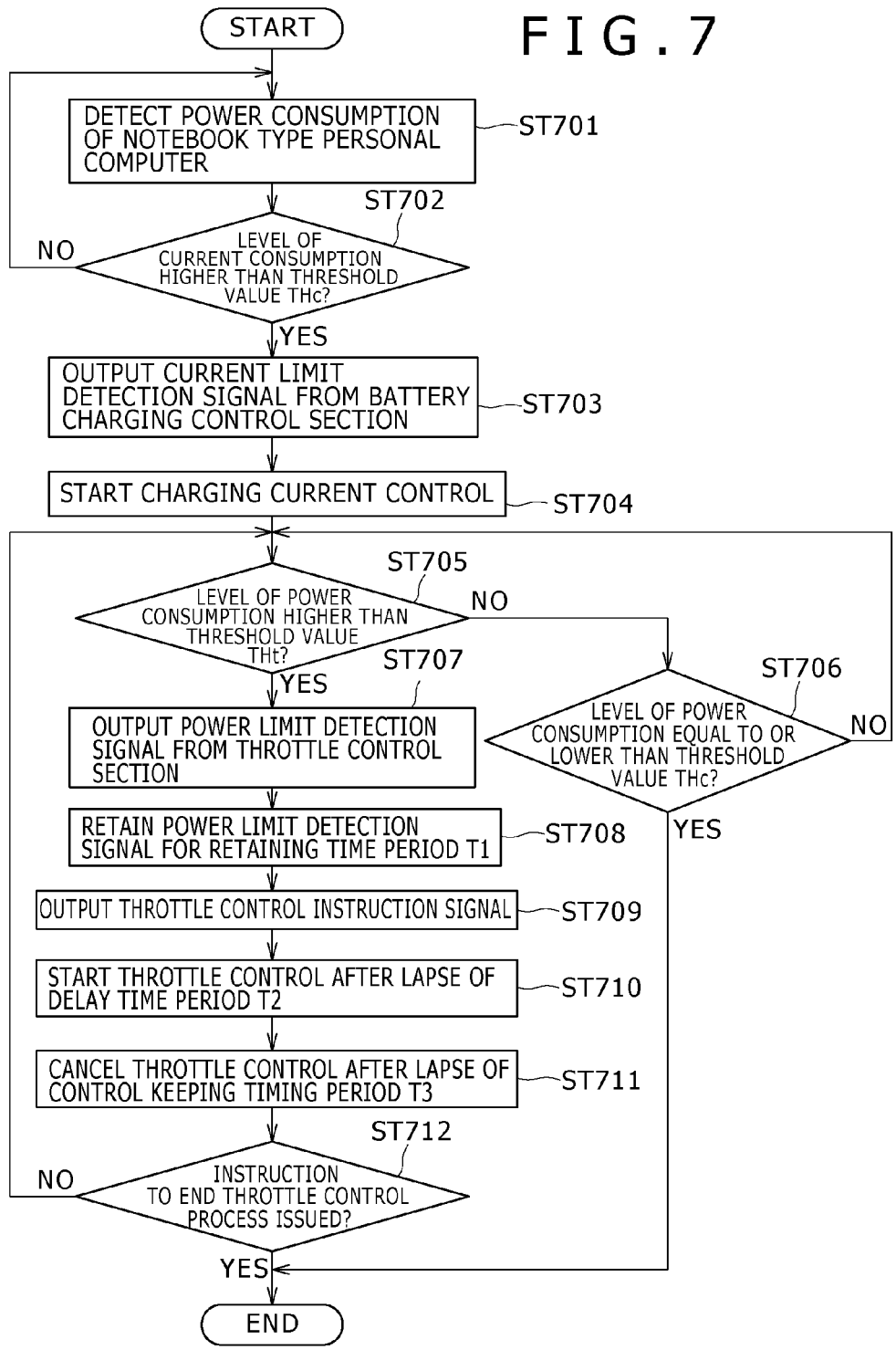
FIG. 7 is a flow chart illustrating a flow of a power saving control process of the notebook type personal computer.

Now, a flow of actions when the notebook type personal computer 1 performs the power saving control based on the threshold values set in such a manner as described above is described. FIG. 7 illustrates the flow of the power saving control process.

Referring to FIG. 7, the current detection section 81 shown in FIGS. 2 and 3 detects the power consumption of the notebook type personal computer 1 (step ST701). In particular, all current In consumed by the notebook type personal computer 1 is detected as the voltage Vs across the detection resistor Rs of the current detection section 81 provided in the feed line 92 as described hereinabove with reference to FIG. 3. It is to be noted that, as described hereinabove, the throttle control section 80 adds the output voltage Vin upon detection of the power consumption.

Then, the detected voltage Vs is amplified by the operational amplifier 75 of the amplification section 71 of the battery charging control section 70 and outputted to the current limit detection section 73 as described hereinabove. Then, the amplified detected voltage and the input current threshold value signal outputted from the input current threshold value adjustment section 72 based on the threshold value set in such a manner as described hereinabove with reference to FIGS. 5 and 6 are compared with each other by the operational amplifier 77. Then, the difference value obtained by the comparison is outputted to the comparator 78. Then, the comparator 78 compares the voltage of the difference and the reference voltage with each other. In other words, the comparator 78 decides whether or not the level of the current consumption is higher than the threshold value THc set as described hereinabove (step ST702). Then, if the level of the current consumption is higher than the threshold value THc (Yes at step ST702), then the comparator 78 outputs a current limit detection signal to the DC/DC converter control section 74 (step ST703).

Then, the DC/DC converter control section 74 suppresses the switching action of the FET switch of the DC/DC converter based on the current limit detection signal to start the charging current control to the battery 44 as described hereinabove (step ST704).

Then, if the level of the current consumption becomes equal to or lower than the threshold value THc as a result of the battery charge current control (Yes at step ST706), then the battery charging current control is ended. However, if the current consumption cannot be suppressed even by the battery charging current control and the comparator 87 of the power limit detection section 84 of the throttle control section 80 decides that the level of the power consumption which exceeds the threshold value THc further exceeds the threshold value THt for the throttle control (Yes at step ST705), then the power limit detection section 84 of the throttle control section 80 outputs a power limit detection signal to the detection signal retaining section 85 (step ST707).

The detection signal retaining section 85 retains the power limit detection signal during the retaining time period T1 (step ST708). In particular, it is assumed that, as seen from a time chart of FIG. 8, the comparator 87 outputs a power limit detection signal at time t1 and stops the outputting at time t2. In this instance, the detection signal retaining section 85 starts outputting of the power limit detection signal to the controller 42 substantially at time t1 and stops the outputting at time t3 which is later by the retaining time period T1 than time t2, that is, after the power limit detection signal is retained.

The retaining time period T1 can be set to various values by changing the time constant Rt/Ct. However, since the controller 42 is formed as a microcomputer as described hereinabove, the retaining time period T1 is set suitably to a time period longer than a polling period Tp of the controller 42. In the present embodiment, for example, if the polling period Tp of the controller 42 is 5 ms, then the detection signal retaining section 85 sets the retaining time period T1 to a value equal to or longer than 5 ms to retain the power limit detection signal.

In particular, the controller 42 detects or receives the power limit detection signal and outputs a throttle control instruction signal to the chip set 41. The interval for detection of the power limit detection signal is 5 ms (time period Tp), and the power limit detection signal cannot be detected unless it is not outputted for a period of time of at least 5 ms. In other words, a delay by the polling period Tp in the maximum occurs after a point of time at which the power limit detection signal is outputted from the comparator 87 until the power limit detection signal is detected by the controller 42, that is, until the throttle control instruction signal is outputted to the chip set 41 as seen from FIG. 8. Therefore, the detection signal retaining section 85 retains the outputting of the power limit detection signal for a period of time, that is, for the retaining time period T1, which is longer than the polling period Tp of the controller 42 which is 5 ms.

Figure 8:
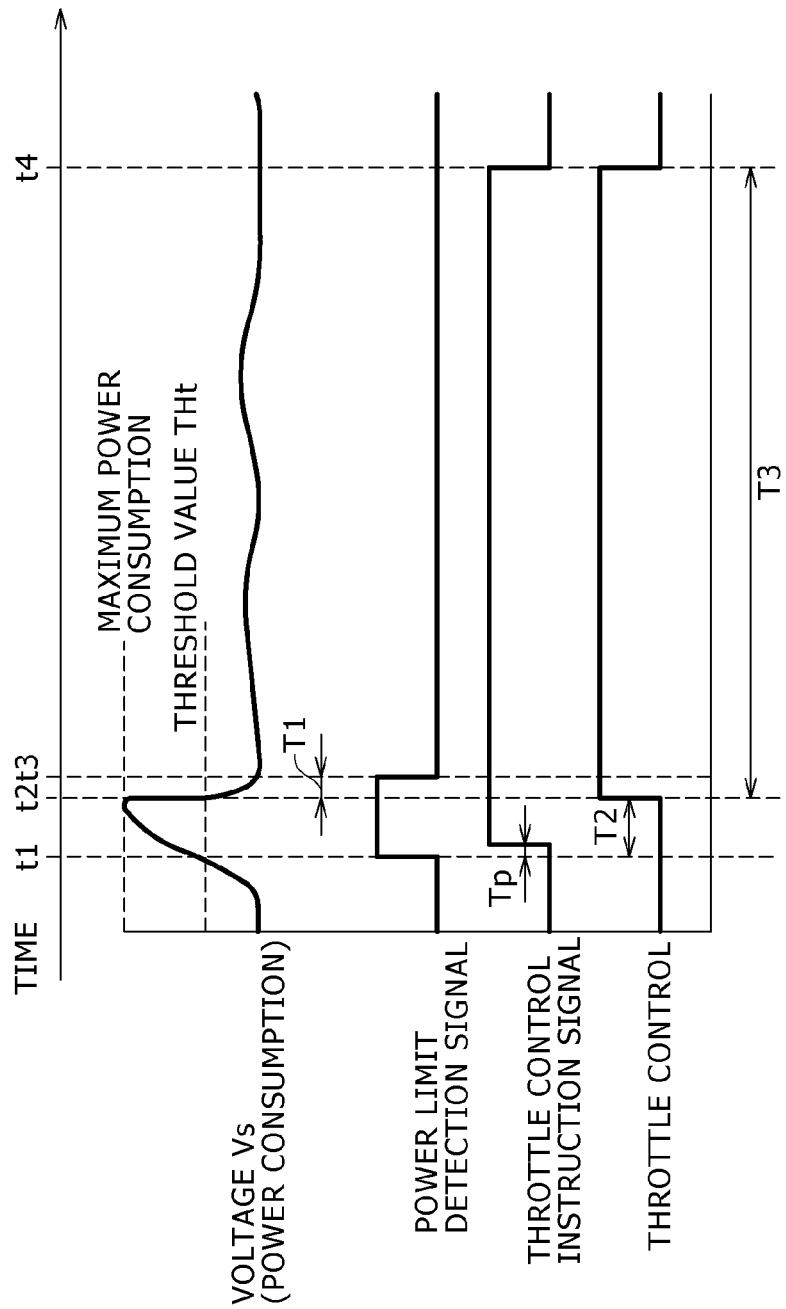
FIG. 8 is a time chart illustrating the power saving control process in the notebook type personal computer.

The controller 42 outputs the throttle control instruction signal to the chip set 41 in this manner (step ST709 of FIG. 7). In other words, the throttle control instruction signal is inputted to the chip set 41 substantially at time t1, that is, at a timing within the polling period Tp, which is 5 ms, after time t1, as seen in FIG. 8.

Where the chip set 41 is an ideal device, when the throttle control instruction is inputted to the chip set 41, the chip set 41 starts the throttle control simultaneously with the inputting. However, actually a delay time period T2 exists before the chip set 41 starts the throttle control. This delay time period T2 is set as a specified value for each product of the chip set 41.

The chip set 41 starts the throttle control after the delay time period T2 elapses after the throttle control instruction signal is outputted from the controller 42 of the battery charging control section 70 of FIG. 7, that is, after the chip set 41 receives the throttle control instruction signal (step ST710).

In this manner, the throttle control is started only at time t2 after the delay time period T2, more accurately the delay time period T2+polling period Tp, elapses after time t1 at which the current In flowing along the feed line 92 exceeds a level corresponding to the threshold value THt, that is, the power consumption of the notebook type personal computer 1 exceeds the threshold value THt which may be the value P1 or P2. In other words, since, within a period of time from time t1 to time t2, the notebook type personal computer 1 is in an uncontrolled state wherein the throttle control is not performed, the state wherein the power consumption of the notebook type personal computer 1 is higher than the threshold value THt continues.

However, since the threshold value THt is set to a value a little lower than the rated power capacity of each of the types of the AC adapter 45 as described hereinabove, even if the threshold value THt is exceeded, the rated voltage capacity is not exceeded immediately. Further, since the rated voltage of the AC adapter 45 is limited by heat generation of the AC adapter 45 itself, the rated voltage is not managed with an instantaneous value thereof but with an average power value for a predetermined period of time. Therefore, even if higher power than the rated power capacity is consumed temporarily, it is determined that it remains within the range of the designed specification of the AC adapter 45 unless both of a prescribed peak power and the average power within the range of the Duty Rate are exceeded.

In this instance, if maximum power consumption continues for the delay time period T2, then it is necessary to execute the throttle control for a control keeping timing period T3 which is nine times the delay time period T2 so that the power consumption of the notebook type personal computer 1 may not exceed the threshold value THt. Here, although the period of time within which the maximum power consumption continues is actually the delay time period T2+polling period Tp as seen from FIG. 8, since the delay time period T2 is much longer than the polling period Tp which is 5 ms, the period of time within which the maximum power consumption continues is regarded as the delay time period T2 ignoring the polling period Tp.

Thus, the controller 42 cancels the throttle control after lapse of the control keeping timing period T3 after the throttle control is started by the chip set 41 by the process at step ST710 of FIG. 7 (step ST711). In other words, the controller 42 cancels the throttle control after lapse of the delay time period T2 after the throttle control instruction signal is outputted by the process at step ST709 of FIG. 7.

In particular, the controller 42 starts the throttle control after lapse of the delay time period T2 after the controller 42 receives the throttle control instruction signal substantially at time t1, that is, at a point of time within the polling period Tp of 5 ms after time t1. Then, while the throttle control instruction signal is received, that is, till time t4, the controller 42 continues the throttle control. Thereafter, the controller 42 stops the throttle control when the supply of the throttle control instruction signal from the controller 42 stops at time t4.

The controller 42 decides whether or not an instruction to end the throttle control process is issued in this manner (step ST712). If the controller 42 decides that such an instruction is not issued, then it returns the processing to step ST705 so that it repeats the processes at the steps beginning with step ST705. Then, if it is decided at step ST712 that an instruction to end the process is issued (Yes at step ST712), then the controller 42 ends the power saving control process.

As described above, the notebook type personal computer 1 can perform the power saving control using the two techniques of the battery charging control and the throttle control, and can set the threshold values (THc and THt) for starting the processes to optimum values (P1 to P4) in response to the rated power capacity of the AC adapter 45. Consequently, the performance of the notebook type personal computer 1 can be suppressed to achieve reduction in weight and cost through use of an AC adapter of a low capacity as the AC adapter 45. On the other hand, where an AC adapter of a high capacity is used as the AC adapter 45, the performance of the notebook type personal computer 1 can be exhibited in the maximum.

Further, optimization of the power control can be achieved by changing the threshold values THc and THt in response to such a use condition of from which one of the battery 44 and the AC adapter 45 the notebook type personal computer 1 is supplied with power to operate or whether or not the notebook type personal computer 1 is connected to the extension unit 40.

Furthermore, the power saving control described above can be implemented only by addition of such a circuit of a minimum scale as shown in FIG. 3 without modifying the hardware of the notebook type personal computer 1 if the apparatus identification information 61 which exists already in the ROM 15 is utilized.

It is to be noted that the present invention is not limited to the embodiment described above but various modifications and alterations can be made without departing from the spirit and scope of the present invention.

Although the power saving control process described above can be executed by hardware, it may be executed otherwise by software, for example, if the AC adapter capacity identification signal, power supply discrimination signal and extension unit connection signal are inputted to a microcomputer. In this instance, the software can be executed by incorporating a program for the execution of the software into hardware for exclusive use or by installing the program, for example, from a recording medium.

In the present embodiment, one bit in the apparatus identification information 61 stored in the ROM 15 is utilized as the AC adapter capacity identification information to set two threshold values for different AC adapters whose rated power capacity is 35 W and 64 W. However, a plurality of bits in the apparatus identification information 61 may otherwise be utilized as the AC adapter capacity identification information so that three or more AC adapters whose rated power capacity is, for example, 80 W, 90 W, 110 W, 120 W and so forth may be identified and threshold values suitable for the AD adapters may be set. In this instance, if the number of bits is 2, then four different AC adapters in the maximum can be identified, if the number of bits is 3, then eight different AC adapters in the maximum can be identified.

Figure 9:
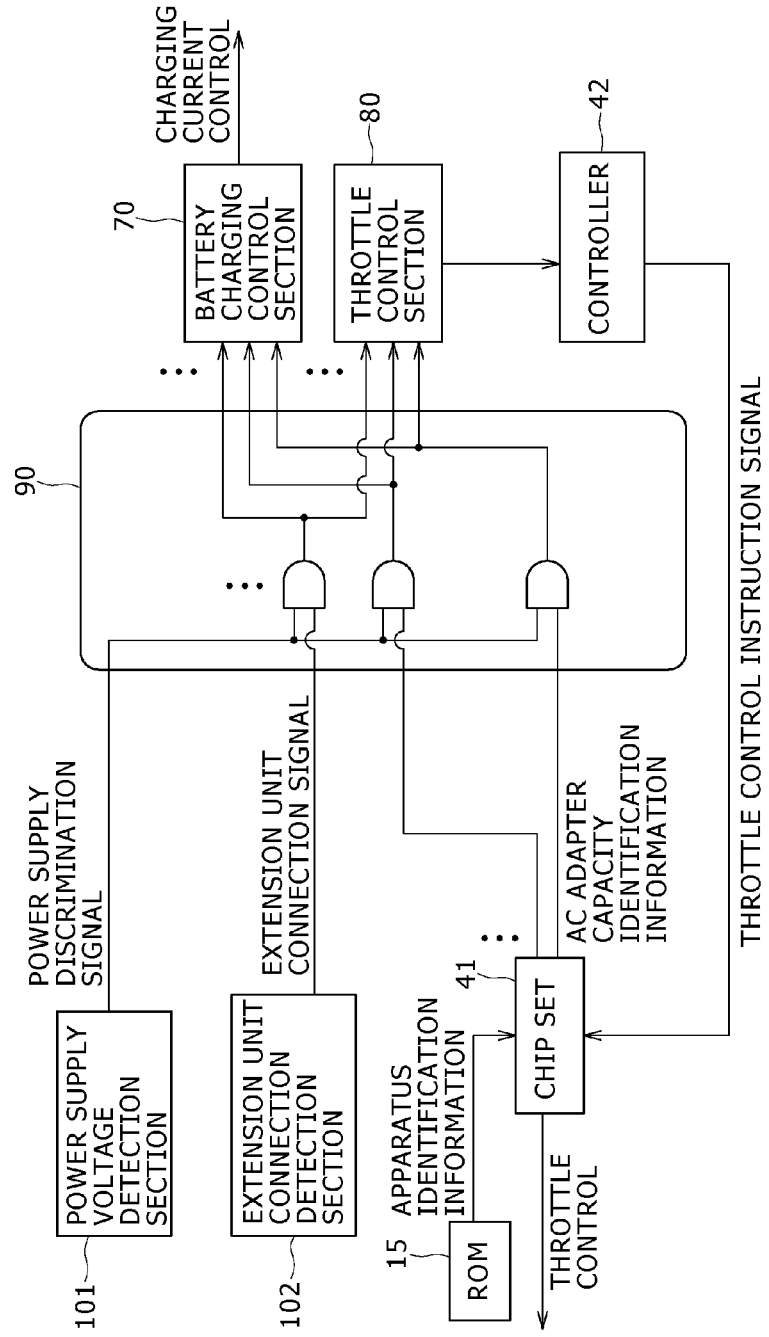
FIG. 9 is a block diagram schematically illustrating a process of setting a threshold value in response to each of three or more AC adapters in a modification to the notebook type personal computer.

FIG. 9 schematically illustrates a process of setting different threshold values for three or more different AC adapters 45. Referring to FIG. 9, the chip set 41 extracts AC adapter capacity identification information 62 of a plurality of bits from the apparatus identification information 61 of the ROM 15 and outputs an AC adapter capacity identification signal in response to the AC adapter capacity identification information of each of the bits to a corresponding one of AND circuits of the power control level decision section 90. The power control level decision section 90 outputs the AC adapter capacity identification signal in combination with the power supply discrimination signal and the extension unit identification signal described hereinabove to the throttle control section 80 and the battery charging control section 70. Each of the throttle control section 80 and the battery charging control section 70 includes, for example, a number of input power threshold value adjustment sections 83 or input current threshold value adjustment sections 72 equal to the number of bits described above and adjusts three or more threshold values based on the signals outputted from the power control level decision section 90 and then outputs corresponding input current threshold value signals. Consequently, also where three or more different AC adapters are available, optimum threshold values to them can be set thereby to perform power control of the AC adapters.

Further, while, in the embodiment described above, the AC adapter capacity identification information 62 is extracted from within the apparatus identification information 61 stored in the ROM 15, it may otherwise be utilized also where some other method is used.

For example, the AC adapter capacity identification information 62 may be placed in the BIOS 31 illustrated in FIG. 1 separately from the apparatus identification information 61. In this instance, the threshold values can set similarly if the BIOS 31 writes AC adapter capacity identification information written therein into the register 19h of the south bridge 19 and then performs a process similar to that in the embodiment described hereinabove. It is to be noted that, upon shipment of the notebook type personal computer 1 from a factory, the BIOS 31 is incorporated while the AC adapter capacity identification information 62 is set differently for each of AC adapters having different rated power capacities.

Further, depending upon the model of the notebook type personal computer 1, a hardware switch of several bits called System ID may be provided. Each of the bits indicates the model information of the OS, CPU or the like, and a certain one or ones of the bits can be utilized as the AC adapter capacity identification information 62.

Figure 10:
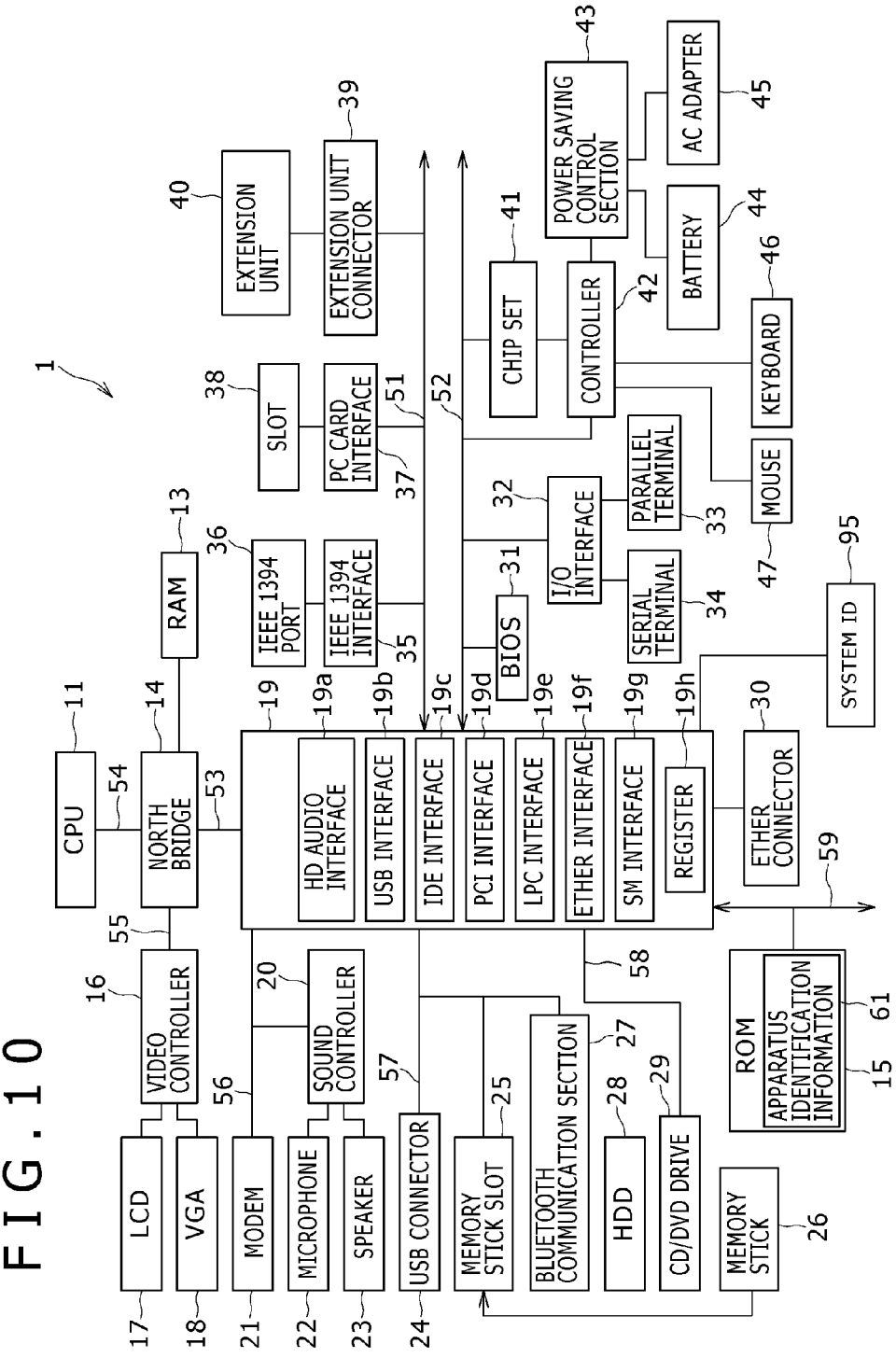
FIG. 10 is a block diagram showing a configuration of a modification to the notebook type personal computer where a System ID is provided.

FIG. 10 shows a configuration of the notebook type personal computer 1 in which the System ID is provided. Referring to FIG. 10, the System ID 95 is connected to the south bridge 19. In this instance, the BIOS 31 reads in the AC adapter capacity identification information 62 from the System ID 95 and writes the read in AC adapter capacity identification information 62 into the register 19h. Therefore, a process similar to that in the embodiment described hereinabove may be performed to set threshold values.

Also it is possible to utilize the AC adapter capacity identification information 62 set in the System ID 95 as it is as an AC adapter capacity identification signal. In this instance, the System ID 95 outputs the AC adapter capacity identification information 62 as an AC adapter capacity identification signal to the power control level decision section 90. Thereafter, a similar process to that in the embodiment described hereinabove may be executed to set threshold values. It is to be set that each of the bits of the System ID 95 can be set by setting the hardware switch described above to the High or Low level, for example, upon shipment of the notebook type personal computer 1 from a factory.

While, in the embodiment described above, the present invention is applied to the notebook type personal computer 1, it can be applied also to any other apparatus which uses an AC adapter such as a portable computer.

What is claimed is:

1. An information processing apparatus that can be supplied with power from an AC adapter or a battery, comprising:
    a first unit configured to output AC adapter identification information including the rated power capacity of the AC adapter;
    a battery;
    a second unit configured to output power supply identification information, the power supply identification identifying whether the information processing apparatus is being supplied power by the battery or the AC adapter;
    a setting unit configured to set a first threshold value and a second threshold value that is higher than the first threshold based on both the AC adapter identification information and the power supply identification information, wherein the first threshold and the second threshold are relating to power consumption of the system;
    a detection unit configured to detect power consumption of the information processing apparatus; and
    a control unit configured to control the power consumption by performing different control schemes depending on which threshold value is exceeded by the power consumption.

2. The information processing apparatus according to claim 1, wherein the control unit controls the power consumption by (1) lowering charging power to the battery when the power consumption exceeds the first threshold value and by (2) lowering clock frequency of the information processor when the power consumption exceeds the higher second threshold value.

3. The information processing apparatus according to claim 1, wherein:
    the setting unit sets only the second threshold value when the power supply identification information identifies that the information processing apparatus is receiving power from the battery, and
    the setting unit sets the first and second threshold values when the power supply identification information identifies that the information processing apparatus is receiving power from the AC adapter.

4. The information processing apparatus according to claim 1, further comprising a third unit configured to output extension unit connection information which represents whether the information processing apparatus is connected to an extension unit, the setting unit also setting the first threshold value and the second threshold value based on the extension unit connection information.

* * * * *